Nov. 1, 1966  D. C. HILL  3,282,595
PISTON RING ASSEMBLY OF FLEXIBLE CIRCUMFERENTIALLY COMPRESSIBLE
SPRING EXPANDER-SPACER AND PISTON RINGS
Filed April 13, 1964  4 Sheets-Sheet 1
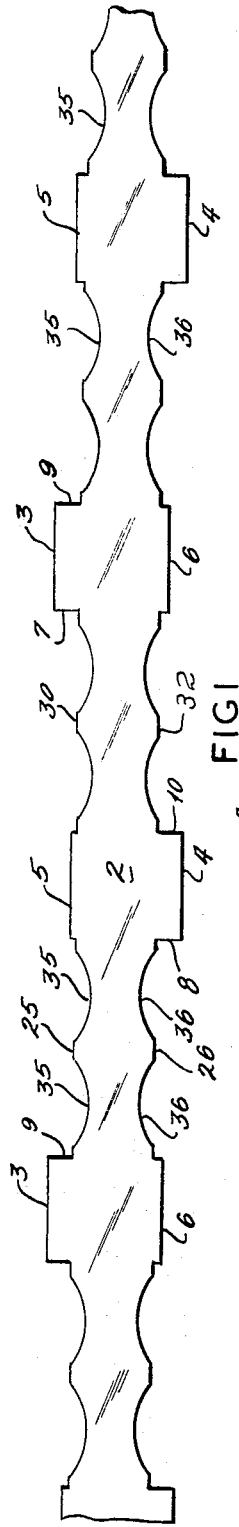
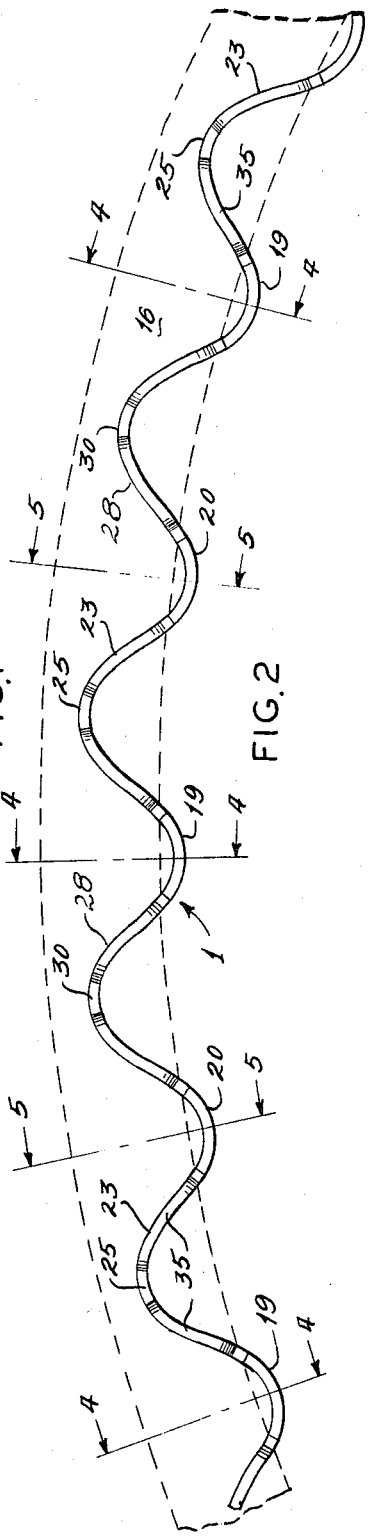
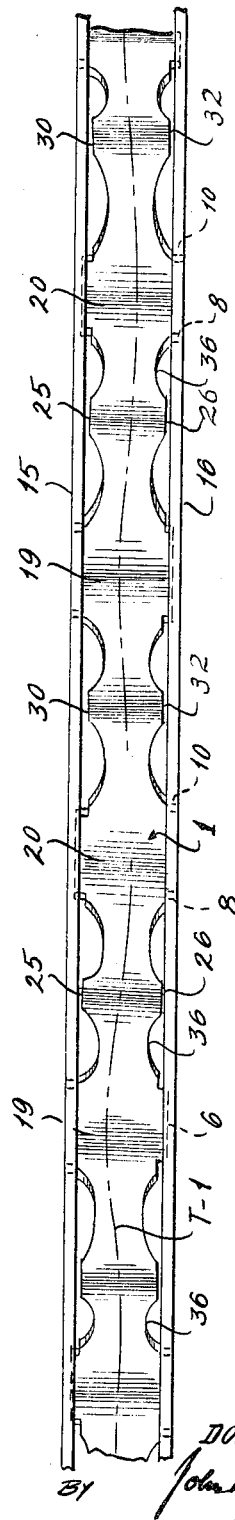
INVENTOR:
DONALD C. HILL
BY
ATTORNEY.

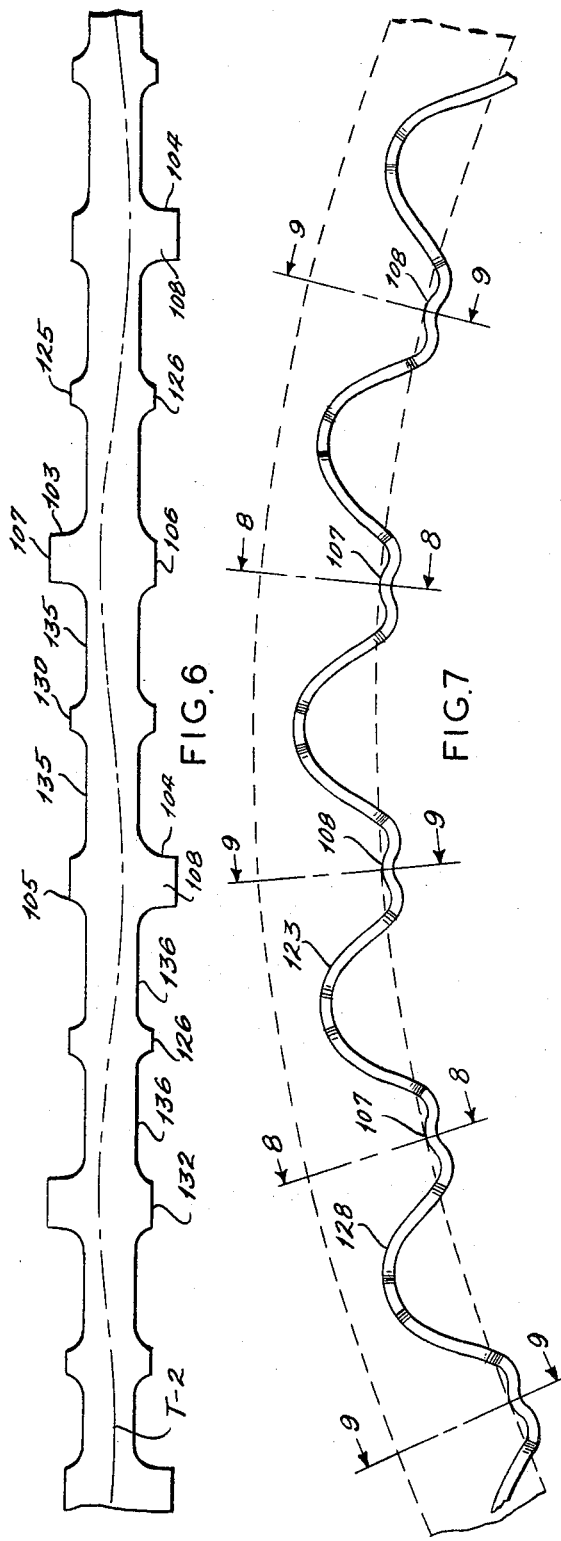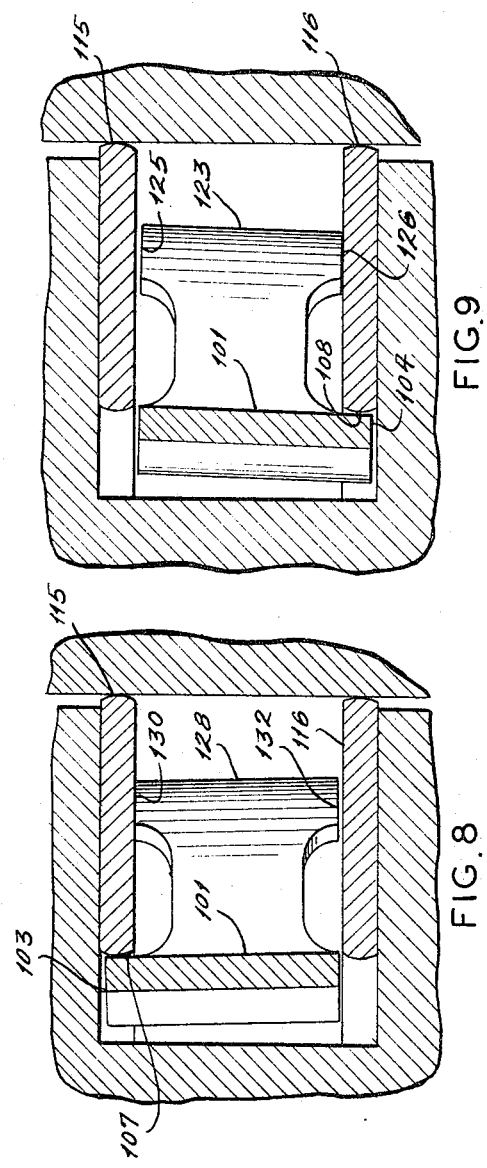

Nov. 1, 1966 D. C. HILL 3,282,595
PISTON RING ASSEMBLY OF FLEXIBLE CIRCUMFERENTIALLY COMPRESSIBLE
SPRING EXPANDER-SPACER AND PISTON RINGS
Filed April 13, 1964 4 Sheets-Sheet 4
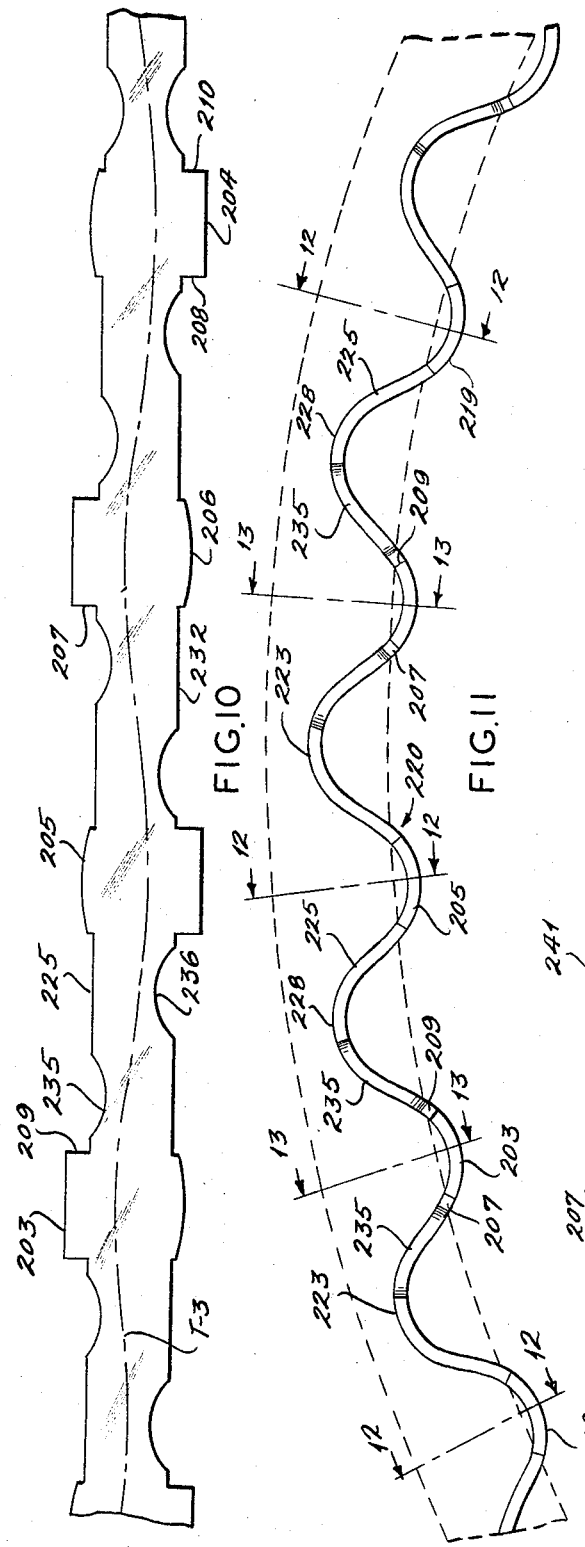
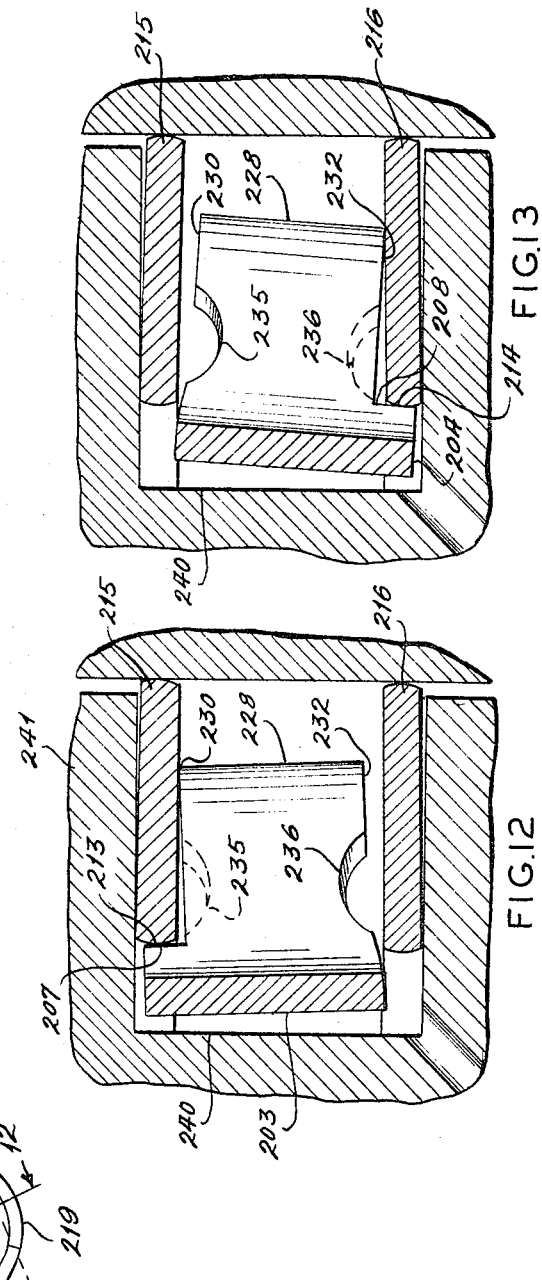

United States Patent Office 3,282,595
Patented Nov. 1, 1966

3,282,595
PISTON RING ASSEMBLY OF FLEXIBLE CIRCUMFERENTIALLY COMPRESSIBLE SPRING EXPANDER-SPACER AND PISTON RINGS
Donald C. Hill, Affton, Mo., assignor to McQuay-Norris Manufacturing Company, St. Louis, Mo., a corporation of Delaware
Filed Apr. 13, 1964, Ser. No. 359,378
2 Claims. (Cl. 277—139)

This invention relates to a piston ring assembly for the pistons of internal combustion engines in which a circumferentially compressible and expansible flexible spring expander-spacer control ring of the non-bottoming type provides radial and axial control forces on a pair of piston rings, or rails, to urge the rails radially against the cylinder wall and axially against the sides of the piston ring groove. More specifically, the spring type expander-spacer control ring acts in such an assembly to seal off the leakage between the piston rings, or rails, and the cylinder wall, and between the piston rings, or rails, and the sides of the piston ring groove. Prior inventions, such as shown in Heslewood et al. 1,500,705, Malpas 2,229,575, and Baumler 2,917,353, have disclosed piston ring assemblies and suggested various ways of obtaining similar action from expander rings of various kinds.

Broadly speaking, these prior devices obtained the axial control forces in two distinctly different ways, by preformed axial corrugations in the spring expander ring to impose a yielding axial force in opposite directions on rails located on opposite sides of the spring expander ring, or, by a radial directed force exerted by the spring expander ring acting through cam-like surfaces to wedge the rails axially apart.

Preformed axial corrugations in a spring expander ring will provide a spring force urging the rails apart, but the force from prefabricated or preformed spring corrugations, heretofore proposed, bears no relationship whatsoever to any radial forces produced by these spring expander rings tending to force the rails radially against the cylinder wall. This is true because manufacturing tolerances enter into the picture. In other words, there is a "stack up" of manufacturing tolerances in any such prefabricated parts. Thus, a ring assembly at maximum tolerance limit as to width, in a groove at minimum tolerance limit as to width, might be so tight a fit that radial expansion of the rails is negligible in spite of the of the spring force exerted, and, if present at all is to all practical extend eliminated by friction. On the other hand, if the axial spring force is correct for the condition set forth above, then this force would be useless in a ring assembly of minimum tolerance limit as to width, in a groove at maximum tolerance limit as to width. These are practical reasons imposed by the limitations of manufacturing processes that negative intended operation of piston ring assemblies using a spring action to produce an axial force on a pair of rails, or piston rings. Because of manufacture, uniform results cannot be expected.

In piston ring assemblies of the kind having an expander-spacer which exerts a radial spring force through cam surfaces to wedge the rails apart axially, there is also the possibility, due to "stacking up" of tolerances, that the wedging action and friction between cam surfaces can stick a ring assembly in a piston groove.

If the benefits of using an expander-spacer to produce both a radial force and an axial force on a pair of rails are to be fully realized, then it is required that the axial force, or forces, acting to spread the rails be maintained proportional to the radial forces tending to expand the rails against the cylinder wall. This dictates a construction of the assembly so that:

(1) The axial forces tending to spread the rails vary as a function of the radial forces tending to expand the rails diametrically; and,
(2) That the manner of obtaining the axial forces does not depend upon sliding friction between cam surfaces which are necessarily exposed to the accumulation of the by-products of combustion.

A further desirable attribute for such an assembly would be physical characteristics whereby a relationship can be established empirically and, thereafter maintained in an actual structure, between axial and radial forces exerted by the expander-spacer control ring.

One form of control ring which meets the above enumerated specifications is shown and described in a prior United States patent application to George C. Mayfield, Serial No. 46,482, filed August 1, 1960, now abandoned for: "Multi-Piece Piston Ring Assemblies." This described structure in effect maintains a relationship between these forces by what amounts to a plurality of connected lever arms some of which are part of a flexible ring body and some of which are lever arms of different length disposed at right angles to the flexible ring body. The latter are shorter lever arms of spring material projecting axially from the flexible ring and are disposed to bear at the inner edge of a rail or piston ring to force the rail against the cylinder wall. The longer arms (in the flexible ring body) are disposed against the radial side faces of the rail and positioned so as to force the rail against the side of a piston ring groove with a force proportional to that exerted by the shorter lever arms to expand the rail, or piston ring. (See page 15, lines 14, etc.)

In the Mayfield application, the expander-spacer is a flat, flexible, control ring having a minimum compressed diameter and is non-bottoming in a piston ring groove. The radial expansive force on the rail is produced by short cantilever spring lever arms on the control ring which engage at the inner diameter of the piston ring or rail when the rail is compressed into the piston groove by the cylinder wall. The resulting loading on the short cantilever spring lever arms causes the longer lever arms in the flat flexible ring body to twist. The twisting causes the flat flexible ring to press axially on the radial face of the rail, pushing it against the side of the ring groove with a force proportional to the loading on the cantilever spring lever arms.

The sole difference between this invention and that described by the Mayfield application is that in the latter, the expander-spacer is a flexible control ring forming a relatively fixed diameter mounting for the cantilever spring lever arms which are relatively springy. In this invention, the cantilever type lever arms are relatively rigid and are mounted on a circumferentially compressible relatively springy ring of variable diameter. This change constitutes an improvement over the prior Mayfield invention since an assembly, according to the present invention resembles conventional control rings, has all of the advantages in operating features described for the prior Mayfield invention, and at the same time is simpler and less expensive to manufacture on present standard machines.

From the foregoing, it is readily apparent that one of the objects of this invention is to provide a piston ring assembly which includes a control ring capable of design to meet specific conditions in the degree and direction of application of the control forces exerted by this control ring on the piston ring element, or elements.

Other objects and advantages of this invention will appear from the following detail description which is in such clear, concise and exact terms as will enable any person skilled in the art to make and use the same when taken in conjunction with the accompanying drawings forming a part thereof:

FIG. 1 is an enlarged view in elevation of a blanked out spring strip for one form of control ring illustrative of this invention;

FIG. 2 is a top plan view shown on an enlarged scale of the blanked out strip of FIG. 1 when corrugated to form a spring with the position of the rails shown in phantom lines;

FIG. 3 is a front elevational view on an enlarged scale illustrating the piston ring assembly with the expander-spacer shown in FIGS. 1 and 2;

FIG. 5a is a view similar to FIG. 5 illustrating the same modification as shown in FIG. 4a;

FIG. 6 is a plan view on an enlarged scale of a blanked out strip for a different form of spacer expander;

FIG. 7 is a top plan view on an enlarged scale illustrating a corrugated spacer expander formed from a blanked out strip shown in FIG. 6 with rails in phantom lines;

FIG. 8 is a transverse sectional view through a ring assembly in a piston ring groove taken on any one of the lines 8—8 of FIG. 7 looking in the direction of the arrows;

FIG. 9 is a transverse sectional view through a ring assembly in a piston ring grove taken on any one of the lines 9—9 on FIG. 7 looking in the direction of the arrows;

FIG. 10 is a plan view on an enlarged scale illustrating another blanked out strip for another form of spacer expander;

FIG. 11 is a top plan view on an enlarged scale illustrating the blank shown in FIG. 10 after corrugation into a spring expander-spacer with the rails shown in phantom lines;

FIG. 12 is a transverse sectional view of a ring assembly in a piston ring groove taken on any one of the lines 12—12 of FIG. 11 looking in the direction of the arrows; and FIG. 13 is a transverse sectional view of a piston ring assembly in a piston ring groove taken on any one of the lines 13—13 of FIG. 11 looking in the direction of the arrows.

Figure 4:
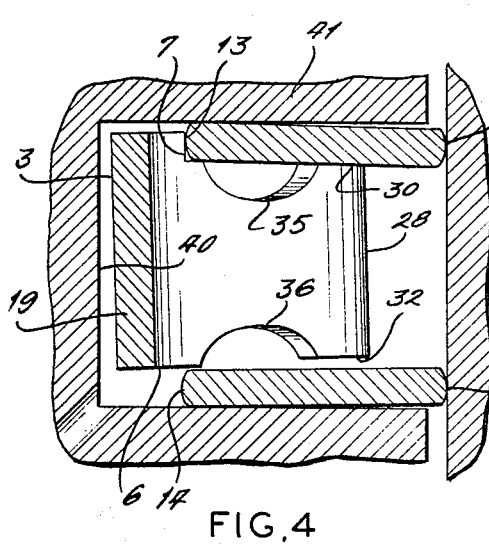
FIG. 4 is a transverse sectional view through the assembly in a piston ring groove taken on the lines 4—4 of FIG. 2 looking in the direction of the arrows.

The instant invention is obtainable by modification of several known forms of control rings used in multipiece piston ring assemblies some of which will be described in detail hereinafter. Any one of these described modifications will attain the objects of this invention, and it is the means for obtaining these objects regardless of specific form which can be considered as the best mode of carrying out this invention.

With reference to FIGS. 1–5, an assembly is shown having an axially corrugated control ring 1 formed of a strip of spring metal 2. This strip of spring metal 2 is blanked out so as to leave a plurality of cantilever type fingers 3 spaced along one edge of the strip 2. Between each of the fingers 3 is a bobbed finger 5. Spaced along the opposite edge of the blanked out strip 2 are a plurality of fingers 4 and again, between each of the fingers 4 is a bobbed finger 6. The fingers 3 and 4 are spaced along the strip so that, when corrugated and formed into a ring, the fingers will be located circumferentially so as to project in opposite directions in an alternate manner. Opposite ends of the strip 2 are brought into abutting relation to form a control ring 1.

Fingers 3 have surfaces 7 and 9 at each edge for engaging an inwardly facing peripheral edge 13 on a piston ring or rail 15. Fingers 4 have surfaces 8 and 10 at each edge of a finger for engaging an inwardly facing peripheral edge 14 on a rail 16. Fingers 3 are on inwardly directed humps 19, while fingers 4 are on inwardly directed humps 20 after the strip 2 is corrugated as shown in FIG. 2. Outwardly directed humps 23 have opposite axial facing surfaces 25 and 26 projecting between the rails 15 and 16 so that these portions act as spacers between the rails. Outwardly directed humps 28 have axial facing surfaces 30 and 32 projecting between the rails 15 and 16 so that these portions also act as spacers. The axially facing surfaces 25, 26, 30 and 32 contact the radial faces on the inside of the rails at a series of points whose loci is intermediately located between the inner and outer peripheral edges of the rails. The radially facing surfaces 7, 8, 9 and 10, all engage along the inner edge of the rails 15 and 16.

As shown in FIG. 1, cutouts 35 and 36 form a symmetrical ventilation for the strip 2 and provide resilient portions between the cantilever type fingers 3 and 4. As will be pointed out in the operative assembly of control ring and rails, these portions are flexible, and because of eccentric loading, actually allow distortion axially of the control ring twisting the control ring in opposite directions at circumferentially spaced locations.

Figure 5:
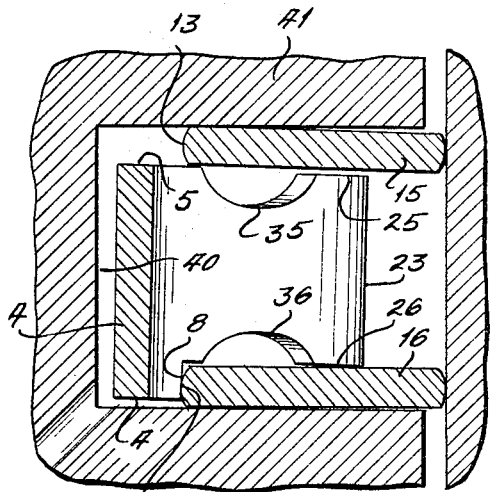
FIG. 5 is a transverse sectional view through the assembly in a piston ring groove taken on any one of the lines 5—5 of FIG. 2 looking in the direction of the arrows.

As shown in FIGS. 1–3, inclusive, the humps 19, 20, 23, 28 have equal pitch so that edges 7 and 9 are unevenly spaced along one rail 15 and edges 8 and 10 unevenly spaced along the other rail 16, but equal pitch is not necessary. If the pitch of the humps 23 and 28 is made one-half that of 19 and 20, an even spacing would be obtained. Whatever the spacing, however, it is characteristic of this and the other constructions hereinafter described, that the alternate top and bottom location of the cantilever type fingers provides radial ring engaging surfaces for the top and bottom rings 15 and 16, surfaces 7 and 9 on the top piston ring 15, and surfaces 8 and 10 on the bottom piston ring 16, in alternate manner around the assembly. The effect of the circumferential offset between fingers 3 and 4, when actual force is applied to rails 15 and 16, due to compression of control ring 1, produces a peculiar twist, the neutral axis of which, is represented roughly by the dotted lines T–1 in FIG. 3 when the piston ring assembly as a whole is installed in a ring groove 40 of a piston 41. This distortion or twist about the neutral axis T–1 produces an effect at alternate locations along the ring, such as illustrated in FIGS. 4 and 5. At least a portion of the axial supporting surface 30 adjacent the surface 7, for example, is biased upwardly to force rail 15 into sealing relation against the upper radial face of ring groove 40. At least a portion of axial facing surface 26 adjacent radial facing surface 8 applies a force axially to the piston ring 16 to hold it in sealing relation against the lower radial face of ring groove 40. Since the portion of the control ring between adjacent fingers is ventilated, a means is provided to make these portions more resilient to accommodate this distortion axially and circumferentially along the control ring, and the axial forces imposed yieldingly urge the rings 15 and 16 into sealing relation with the sides of the ring groove 40. These yielding forces are proportional to the radial forces exerted by fingers 3 and 4, and in no case greater in degree or amount than the fractional relationship between the distance axially from surface 30 to the point of contact of surface 7 on ring 15 (the short lever arm) divided by the distance radially from surface 30 to the point of contact of surface 7 on ring 15 (the longer lever arm). This ensures that the axial forces imposed on the piston rings 15 and 16 cannot exceed a certain fraction of the radial forces. This fractional relationship can be determined empirically so that the radial forces imposed by the fingers 3 and 4 along the piston rings 15 and 16 are always the dominant forces overcoming any frictional resistance created by the axially directed forces holding the piston rings against the sides of the ring groove. This ensures that the dominant radial forces will accomplish the primary purpose of maintaining the outer periphery of the piston rings 15 and 16 in sealing relation with the cylinder wall.

The short and long lever arm effect is illustrated in FIG. 4. Here the spring force radially on the ring 15 exerted by finger 3 through surfaces 7 and 9 causes the hump 28 to twist counterclockwise. The short lever arm at 3 lifts the longer lever arm at 30. As FIG. 5 shows, the opposite twist occurs due to the spring force between finger 4 and piston ring 16, and surface 26 then presses piston ring 16 against the lower side wall of ring groove 40.

Figure 4A:
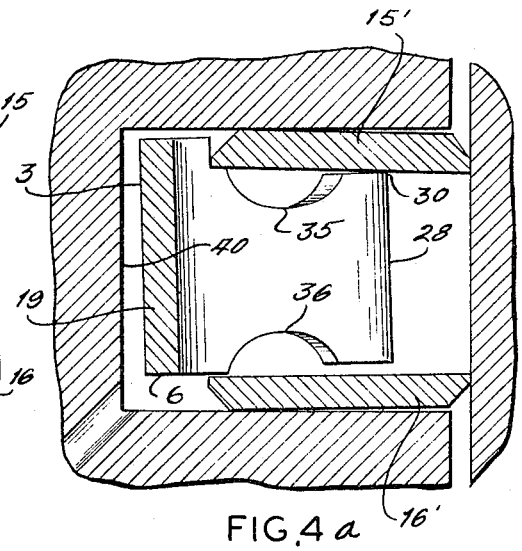
FIG. 4a is a transverse sectional view corresponding with FIG. 4 illustrating a modified form of spacer expander in the same assembly.
Figure 5A:
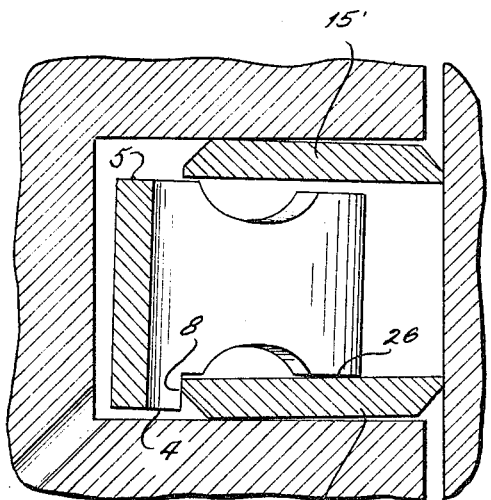

The bobbed fingers 5 and 6 usually are so foreshortened that they have little or no contact with the rails 15 and 16 as shown in FIGS. 4 and 5. In FIGS. 4a and 5a, however, a modification is shown which differs from that above described only in the cross-sectional shape of the piston rings used. This slight change in structure permits the bobbed fingers to press the piston rings axially.

Since the embodiments in FIGS. 4a and 5a differ only in the respect above mentioned, the same parts have been given the same reference characters except for the piston rings which in modified form are identified as 15' and 16'. Otherwise than as above-mentioned, the parts in FIGS. 4a and 5a differ only in the cross-section of the piston rings 15' and 16'. The control ring is the same. It will be apparent from an examination of FIG. 4a that the radial force on finger 3 (the short lever arm) tending to twist the control ring counterclockwise is resisted by two forces, one on the surface 30 against the piston ring 15' (the longer lever arm) and by pressure of the surface of the bobbed finger 6 on the inner periphery of the piston ring 16'. The opposite situation is shown in FIG. 5a in which the radial force exerted by the finger 4 against an inner peripheral edge of the piston ring 16' causes a clockwise twist in the control ring, and this force produces a reaction on the short lever arm which is resisted by an axial force between the axial facing surface 26 and the inner face of the piston ring 16' (the longer lever arm) and, of course, by the axial force between the surface of the bobbed finger 5 and the inner periphery of the upper piston ring 15'.

FIGS. 6–9, inclusive, show the above-described invention applied to a control ring of the kind shown in the United States patent application of Theodore P. Rodenkirchen, Serial No. 163,462, filed: January 2, 1962, now Patent No. 3,140,096, for: "Piston Ring Assembly With Improved Bearing Contact." Parts which correspond in function to those described in FIGS. 1–5 are indicated by the same numerical reference character with 100 added, and the same alphabetical reference character with 2 substituted for 1. Keeping this in mind, the relationship between the several parts shown in FIGS. 6–9 is readily understandable from the description of the corresponding parts in FIGS. 1–5.

FIGS. 10–13, inclusive, show the above-described invention in FIGS. 1–5 applied to a control ring of the kind shown in United States Patent 3,004,811, issued October 17, 1961, for: "Piston Ring Assemblies" to George C. Mayfield. Parts which correspond in function to those described in FIGS. 1–5 are indicated by the same numerical reference character with 200 added and the same alphabetical reference character with 3 substituted for 1. Again, keeping this in mind, the relationship between the several parts shown in FIGS. 10–13 is readily understandable from the prior description of the corresponding parts in FIGS. 1–5.

The operation of the modifications in FIGS. 6–13 is identical with that described in FIGS. 1–5.

Changes in and modifications of the constructions described may be made without departing from the spirit of my invention or sacrificing its advantages.

Having thus described the invention, what is claimed and desired to be secured by Letters Patent is:

1. In a compressible and expansive non-bottoming type of piston ring assembly diametrically and axially dimensioned to be received in a piston ring groove with its inner periphery spaced from the bottom of the piston ring groove when held compressed in said groove by the wall of a cylinder for the piston, a pair of split annular radially expansible and contractible piston rings in said piston ring assembly each having a plain radial face for sealing contact with one side of the piston ring groove, and each having an outer peripheral face for sealing contact with the wall of a cylinder, an annular corrugated circumferentially expansible and compressible spring expander-spacer control ring in said piston ring assembly having oppositely directed humps some of which are directed between said pair of piston rings to act as spacers, and relatively rigid axially extending cantilever type fingers forming a continuation of, and projecting from, some of said humps on said spring expander-spacer control ring and offset radially inwardly from the outer periphery of said control ring and offset a lesser degree in opposite axial directions from said control ring to engage an inwardly facing peripheral edge on each of said pair of piston rings so that when said assembly is in operative position, said control ring is held compressed in said piston ring groove to a minimum diameter greater than the diameter at the bottom of said piston ring groove, the improvement comprising, (a) a plurality of ring engaging surfaces on said axial extending cantilever type fingers for directly engaging said inwardly facing peripheral edge on each of said pair of piston rings, said surfaces facing in the same direction on top and on the bottom with respect to the portion of a piston ring in contact therewith, and said surfaces being spaced along said control ring to engage with said pair of piston rings at points spaced circumferentially around said piston rings in an alternating manner therebetween, and (b) means forming spaced resilient portions in said control ring between said cantilever type fingers to provide flexibility for distortion axially along said control ring, said annular piston rings being dimensioned diametrically and in width so that when said assembly is compressed to said operating condition, said inwardly facing peripheral edges press radially inwardly against said alternately arranged ring engaging surfaces on said cantilever type fingers with a force sufficient to cause circumferential compression in said control ring by radial inward displacement of said fingers on opposite sides of said control ring and twisting in opposite directions axially therealong, causing the humps adjacent said cantilever type fingers which act as spacers between said piston rings to exert more axial pressure on the radial face of one of said piston rings than on the other, oppositely top and bottom, circumferentially around said control ring, to urge each of said piston rings into sealing engagement with a side of the piston ring groove with resilient axially directed forces which are less than, but proportional to, the radial forces exerted on said piston rings by said control ring through said cantilever type fingers.

2. In a compressible and expansible non-bottoming type of piston ring assembly diametrically and axially dimensioned to be received in a piston ring groove with its inner periphery spaced from the bottom of the piston ring groove when held compressed in said groove by the wall of a cylinder for the piston, a pair of split annular radially expansible and contractible piston rings in said piston ring assembly each having a plain radial face for sealing contact with one side of the piston ring groove, and each having an outer peripheral face for sealing contact with the wall of a cylinder, an annular corrugated circumferentially expansible and compressible spring expander-spacer control ring in said piston ring assembly having oppositely directed humps some of which are directed between said pair of piston rings to act as spacers, and relatively rigid axially extending cantilever type fingers forming a continuation of, and projecting from, some of said sumps on said spring expander-spacer control ring and offset radially inwardly from the outer periphery of said control ring and offset a lesser degree in opposite axial directions from said control ring to engage an inwardly facing peripheral edge on each of said pair of piston rings so that when said assembly is in operative position, said control ring is held compressed in said piston ring groove to a minimum diameter greater than the diameter at the bottom of said piston ring groove, the improvement comprising,
  (a) a plurality of ring engaging surfaces on said axially extending cantilever type fingers for directly engaging said inwardly facing peripheral edge on each of said pair of piston rings, said surfaces being substantially parallel on all of said cantilever type fingers when said control ring is in inoperative, relaxed condition, and said surfaces being spaced along said control ring to engage with said pair of piston rings at points spaced circumferentially around said piston rings in an alternating manner therebetween, and
  (b) means forming spaced resilient portions in said control ring between said cantilever type fingers to provide flexibility for distortion axially along said control ring, said annular piston rings being dimensioned diametrically and in width so that when said assembly is compressed to said operating condition, said inwardly facing peripheral edges press radially inwardly against said alternately arranged ring engaging surfaces on said cantilever type fingers with a force sufficient to cause circumferential compression in said control ring by radial inward displacement of said fingers on opposite sides of said control ring and twisting in opposite directions axially therealong, causing the humps adjacent said cantilever type fingers which act as spacers between said piston rings to exert more axial pressure on the radial face of one of said piston rings than on the other, oppositely top and bottom, circumferentially around said control ring, to urge each of said piston rings into sealing engagement with a side of the piston ring groove with resilient axially directed forces which are less than, but proportional to, the radial forces exerted on said piston rings by said control ring through said cantilever type fingers.

References Cited by the Examiner
UNITED STATES PATENTS 3,004,811  10/1961  Maffield _____ 277—141 X
3,140,096  7/1964  Rodenkirchen _____ 277—141

LAVERNE D. GEIGER, *Primary Examiner*.

J. S. MEDNICK, *Examiner*.

UNITED STATES PATENT OFFICE
CERTIFICATE OF CORRECTION

Patent No. 3,282,595                            November 1, 1966

Donald C. Hill

It is hereby certified that error appears in the above numbered patent requiring correction and that the said Letters Patent should read as corrected below.

Column 1, line 49, strike out "of the"; column 3, line 35, for "grove" read -- groove --; column 5, line 37, for "short lever arm" read -- (short lever arm) --; line 75, for "expansive" read -- expansible --; column 6, line 28, for "axial" read -- axially --; column 7, line 4, for "sumps" read -- humps --.

Signed and sealed this 5th day of September 1967.

(SEAL)
Attest:

ERNEST W. SWIDER                                    EDWARD J. BRENNER
Attesting Officer                                           Commissioner of Patents